(12) United States Patent
Tian et al.

(10) Patent No.: US 12,477,643 B2
(45) Date of Patent: Nov. 18, 2025

(54) HIGH WATTAGE POWER OVER ETHERNET ILLUMINATION FIXTURES

(71) Applicant: Ikan International, LLC, Houston, TX (US)

(72) Inventors: James Yuan Tian, Sugar Land, TX (US); Kevin Lu, Richmond, TX (US)

(73) Assignee: Ikan International, LLC, Houston, TX (US)

(*) Notice: Subject to any disclaimer, the term of this patent is extended or adjusted under 35 U.S.C. 154(b) by 0 days.

(21) Appl. No.: 18/942,372

(22) Filed: Nov. 8, 2024

(65) Prior Publication Data

US 2025/0159783 A1    May 15, 2025

Related U.S. Application Data

(60) Provisional application No. 63/597,616, filed on Nov. 9, 2023.

(51) Int. Cl.
*H05B 47/185* (2020.01)

(52) U.S. Cl.
CPC ................ *H05B 47/187* (2024.01)

(58) Field of Classification Search
CPC .................................... H05B 47/187
See application file for complete search history.

(56) References Cited

U.S. PATENT DOCUMENTS

| 10,172,214 | B2* | 1/2019 | Van Endert | H04L 12/10 |
| 10,355,493 | B1* | 7/2019 | Fackert | H05B 47/18 |
| 2007/0025452 | A1 | 2/2007 | Schindler | |
| 2016/0072990 | A1* | 3/2016 | Dinev | H04N 23/66 348/207.11 |
| 2017/0023193 | A1* | 1/2017 | Thosteson | A01G 9/249 |
| 2017/0271914 | A1* | 9/2017 | Crenshaw | H02J 9/065 |
| 2018/0139823 | A1* | 5/2018 | Hick | H05B 47/19 |
| 2018/0294982 | A1* | 10/2018 | Boemi | H04L 12/40045 |
| 2019/0132928 | A1 | 5/2019 | Rodinger et al. | |
| 2020/0142464 | A1 | 5/2020 | Ekanayake et al. | |
| 2021/0109581 | A1* | 4/2021 | Rodriguez | H04L 12/10 |

(Continued)

OTHER PUBLICATIONS

PCT/US2024/055272, Jan. 15, 2025, International Search Report and Written Opinion.

(Continued)

*Primary Examiner* — Raymond R Chai
(74) *Attorney, Agent, or Firm* — Wolf, Greenfield & Sacks, P.C.

(57) ABSTRACT

The techniques described herein relate to methods and apparatus for a power over Ethernet (PoE) light for media applications. The PoE light includes a light, wherein the light requires a wattage of at least 30 watts for proper operation. The PoE light includes a processor configured to control the light. The PoE light includes a port in electrical communication with the processor, wherein the port is configured to receive an Ethernet cable that provides communication with a router, wherein the router provides over the Ethernet cable both: power for the PoE light to operate at the wattage, and data communications for the PoE light so that the processor can transmit and receive data communications according to DMX (Digital Multiplex) protocol so the light can be remotely controlled by a user.

20 Claims, 15 Drawing Sheets

(56) References Cited

U.S. PATENT DOCUMENTS

2021/0385928 A1\* 12/2021 Jiang .................. G05D 3/12
2023/0084285 A1    3/2023 Brenguier
2024/0418348 A1\* 12/2024 Jurik .................. H05B 47/17

OTHER PUBLICATIONS

International Search Report and Written Opinion for Application No. PCT/US2024/055272, mailed Jan. 15, 2025.

\* cited by examiner

HIGH WATTAGE POWER OVER ETHERNET ILLUMINATION FIXTURES

RELATED APPLICATION

This application claims priority under 35 U.S.C. § 119(e) to U.S. Provisional Application Ser. No. 63/597,616, titled "HIGH WATTAGE POWER OVER ETHERNET ILLUMINATION FIXTURES," filed on Nov. 9, 2023, which is herein incorporated by reference in its entirety.

TECHNICAL FIELD

The techniques described herein are generally related to high wattage power over Ethernet (PoE) illumination fixtures. In particular, the techniques relate to separately-mountable PoE illumination fixtures, including but not limited to, panel and Fresnel lights, which operate at 30 watts or more.

BACKGROUND

Generally, media applications, such as video broadcasting, require sufficient lighting in order to ensure high quality of the video or like product. Various types of lights are used for such purposes. As a few examples, panel lights may be used to provide lighting to broader areas, while Fresnel lights may be used to provide more focused light.

SUMMARY OF INVENTION

Some embodiments relate to a power over Ethernet (POE) light for media applications, comprising: a light, wherein the light requires a wattage of at least 30 watts for proper operation; a processor configured to control the light; a port in electrical communication with the processor, wherein the port is configured to receive an Ethernet cable that provides communication with network equipment such as a hub (e.g., a router), switch, or a PoE injector, for example, wherein the network equipment provides over the Ethernet cable both: power for the PoE light to operate at the wattage; and data communications for the PoE light so that the processor can transmit and receive data communications (e.g., Art-Net, sACN, and/or other protocols for lighting control such as DMX (Digital Multiplex) protocol, for example) so the light can be remotely controlled by a user.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
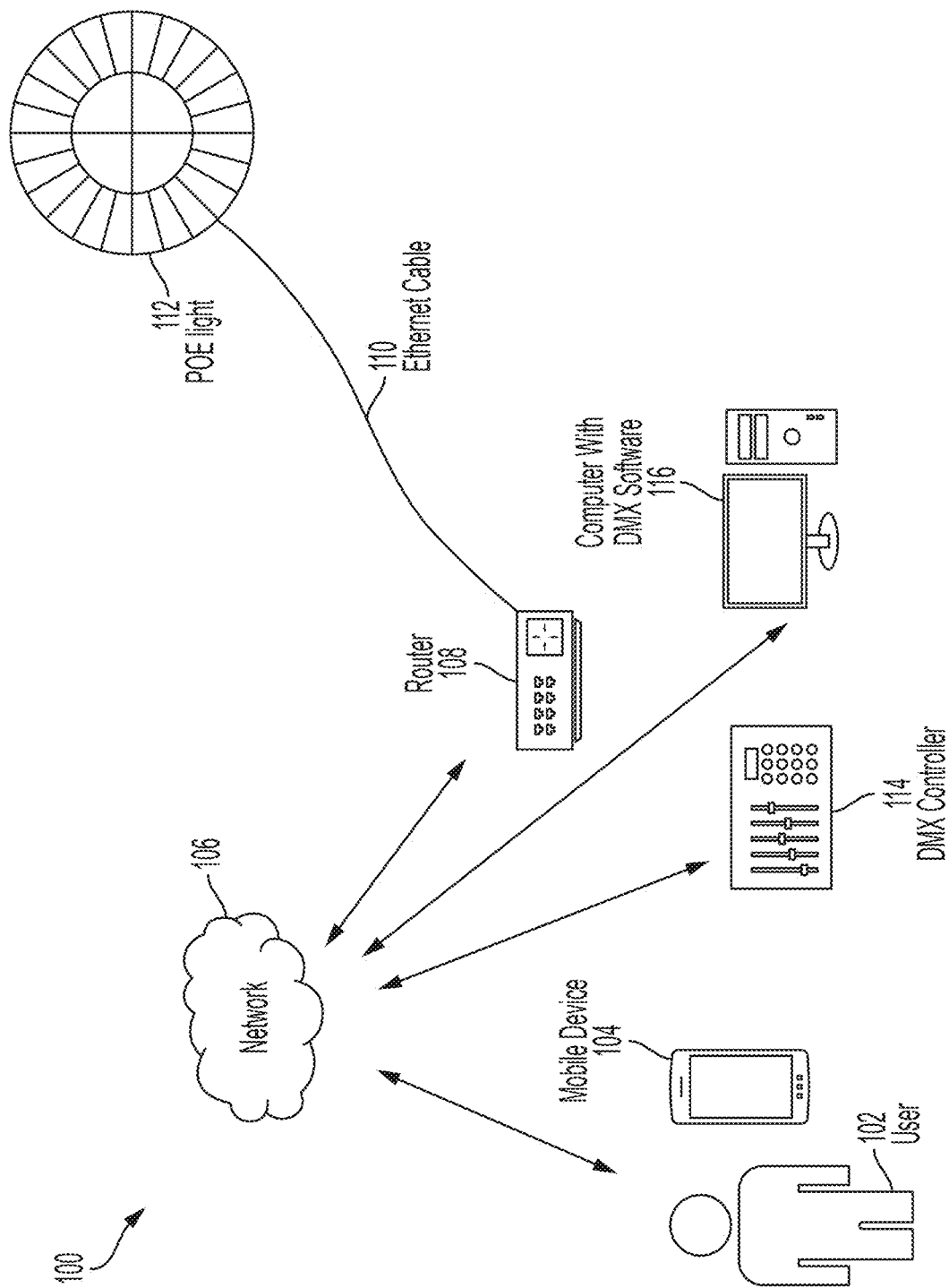
FIG. 1 is a diagram of an exemplary system that allows a user to use a mobile device to communicate with a Power over Ethernet (PoE) light, according to some embodiments of the technology described herein.

The techniques described herein provide for high wattage Power over Ethernet (PoE) illumination fixtures, including but not limited to PoE panels, Fresnel lights, ellipsoidal reflector spotlights, par can lights, and motorized moving lights. PoE lights are one type of light that may be used for various lighting scenarios, since PoE technology can supply both current and data over at least one cable (e.g., over at least one Ethernet cable) via a common point-to-point Ethernet network. PoE lights may come in different forms. Conventional PoE lights are relatively low wattage, such as just a few watts. However, such low wattage lights are typically not sufficient for many lighting scenarios, including for media lighting applications. Various applications thus still require the use of conventional (non-PoE lights) in order to achieve sufficient lighting. However, lights with higher wattage often require extensive wiring, which can be cumbersome to set up as well as expensive. For example, extra wiring may require the installation of extra alternating current (AC) power outlets. Many lights are mounted from the ceiling, and thus would require running AC outlet power in the ceiling. Under many building codes, installing new AC outlets requires permitting, which increases the cost and hassle of installation. Some building codes even require the installation of expensive AC current limiters in AC electrical circuits to ensure that a user cannot exceed the maximum AC power allowed under the building's energy codes.

Frequently, conventional PoE lights are mounted and controlled as a set. For example, track lighting is a common form of interior lighting involving multiple light fixtures supported on a single track. Such PoE lights typically have a plurality of cables (e.g., a plurality of RJ-45 cables) in order to power and control the entire set of track lights. The track may only have one or two AC electrical circuits disposed on it. This limits a user to controlling all of the light fixtures on the track together, since they all receive power from the same one or two AC electrical circuits. However, in some cases, it may be desirable to mount and control the light fixtures individually.

Recognizing the shortcomings of conventional lights and conventional PoE lights described above, the inventors have developed high wattage PoE lights for media applications that are both powered and controlled by at least one Ethernet cable. The Ethernet cable(s) may be, but are not limited to, RJ45 Category 6 (Cat-6) cable(s). The PoE light supports higher wattage requirements than conventional PoE lights. For example, the PoE light may require 50 watts for operation, or the PoE light may require 90 watts for operation. As another example, the PoE light may require 125 watts for operation, or the PoE light may require 150 watts for operation. As another example, the PoE light may require 165 watts for operation. Additionally, unlike conventional track lighting systems, the PoE light is able to be mounted and controlled independently via at least one Ethernet cable. For example, a PoE light may be mounted on its own below standard drop ceilings with scissor clamps.

In order to meet the various requirements of multiple lighting scenarios, different types of PoE lights can be implemented according to the techniques described herein. For example, the PoE light may be a Fresnel light, panel light, ellipsoidal reflector spotlight, par can light, motorized moving light, and/or other PoE light that is implemented according to the techniques described herein. The PoE light may be controlled via various protocols, such as PoE protocols to control the power aspects and/or DMX protocols to control the data aspects. For example, the PoE light can be controlled via DMX-over-IP protocols, such as ArtNet and Streaming ACN (sACN). As another example, the PoE lights may operate according to various PoE protocols, including IEEE 802.3af, 802.3at, and/or 802.3bt. As described below, the PoE light can be set up to operate according to a specific protocol, and includes circuitry that provides for modifying aspects of the light source (e.g., the LED(s)) without needing to change the protocol. For example, 802.3bt can be used, which allows for providing up to 90 watts of power, and various wattage light sources can be supported and controlled by using pulse width modulation (PWM), as discussed further herein. Advantageously, for example, a range of wattages can be supported and dimming functionality can be supported in a manner that does not require adjusting, for example, voltage or amperage directly (e.g., to change light settings during operation) and without needing to switch between/among the various PoE protocols. The PoE light may be built with Ingress Protection to promote use in outdoor spaces. For example, the PoE light may be waterproof, having an IP65 rating.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 is a diagram of an exemplary system 100 that allows a user to communicate with a Power over Ethernet (PoE) illumination fixture, according to some embodiments of the technology described herein. FIG. 1 includes a user 102, and a mobile device 104 that may be used by the user. User 102 may additionally or alternatively use a DMX controller 114 and/or a computer 116 with DMX software to control the illumination fixture using any of the available commands provided by DMX. Mobile device 104, DMX controller 114, and computer 116 are all connected to a network 106. Network 106 is additionally connected to network equipment (in this example, a router 108), which is in communication with PoE illumination fixture 112. FIG. 1 depicts the network equipment as router 108, but the network equipment may additionally and/or alternatively include other network equipment, such as a hub, switch, PoE injector, and/or any device that can send power and data over Ethernet. In some embodiments, router 108 may be connected to a switch (not shown in FIG. 1) and/or may include combined routing and switching functionality (e.g., such as a Netgear commercial grade switch). The PoE illumination fixture 112 can be any illumination fixture, such as a panel light, a Fresnel light, an ellipsoidal reflector spotlight, a par can light, a motorized moving light, and/or other illumination fixture that is implemented according to the techniques described herein, and will be referred to herein in some embodiments as a PoE light 112. A PoE light 112 may be, but is not limited to, a CCT light (e.g., tungsten white lights, daylight white lights, and/or tunable white lights between tungsten to daylight color temperatures), a full RGB color light, and/or combined RGB and CCT implementations, which can be referred to as RGBW and/or RGBWA lights (where W stands for white, and A stands for amber). A single Ethernet cable 110 provides communication between router 108 and PoE light 112.

User 102 can use mobile device 104, DMX controller 114, and/or computer 116 to communicate with PoE light 112 via network 106. User 102 may enter commands into mobile device 104, DMX controller 114, and/or computer 116, such as via a software application running on any of these devices and/or controls on any of these devices, to adjust various features of PoE light 112, such as color temperature (CCT) and intensity. In embodiments in which user 102 uses DMX controller 114 or computer 116 with DMX software, user 102 may also adjust features of PoE light 112 commensurate with what is allowed under the DMX protocol employed by DMX controller 114 or the DMX software on computer 116. Such features may include, for example, the intensity of the PoE light 112, the color temperature of PoE light 112, light channels such as RGB channels and/or RGBWA channels of the PoE light 112, the toggling of certain effects on PoE light 112, such as flashing, a party effect, or a candle effect, etc.

Mobile device 104, DMX controller 114, or computer 116 may then send these commands to router 108 via network 106. Router 108 then may transmit the commands over Ethernet cable 110 to PoE light 112, at which point the processor in PoE light 112 (discussed with reference to further figures below) may process the commands and cause PoE light 112 to be adjusted accordingly.

In addition to sending commands to PoE light 112 over Ethernet cable 110, router 108 powers PoE light 112 via Ethernet cable 110. Router 108 may provide, for example, up to 30 watts of power, 50 watts of power, 60 watts of power, 90 watts of power, 125 watts of power, 150 watts of power, 165 watts of power and/or the like, to PoE light 112. In some embodiments, PoE light 112 can be configured to operate according to IEEE 802.3bt, which can be used to provide illumination fixtures with up to 90 watts. In the embodiment illustrated in FIG. 1, router 108 is connected to only one PoE light 112, and thus provides power and data communications for only one PoE light 112. However, in other embodiments, router 108 may be connected to a number of PoE lights, and may provide up to 90 watts of power to each of the number of PoE lights via Ethernet cables connected to each of the PoE lights. For example, in some embodiments, router 108 may be connected to and provide up to 90 watts of power to each light and can power up to 8 PoE lights 112. In some examples, router 108 may be connected to and provide up to 90 watts of power to each light up to 16 PoE lights 112. In yet other examples, router 108 may be connected to and provide up to 125 watts of power to each PoE light 112. In still yet other examples, router 108 may be connected to and provide up to 150 watts of power to each PoE light 112. In still yet other examples, router 108 may be connected to and provide up to 165 watts of power to each PoE light 112. The router 108 can assign a unique programmable internet protocol (IP) address to each of the PoE light(s).

In some embodiments, Ethernet cable 110 may be, but is not limited to a RJ45 cable, such as an RJ45-Category 6 (Cat-6) cable. The processor of PoE light 112 transmits and receives data communications to and from router 108 according to a DMX-over-IP protocol via the Ethernet cable 110. In some embodiments, PoE light 112 is controlled using DMX-over-IP protocols, examples of which include, but are not limited to, Art-Net and sACN. Art-Net is, for example, a protocol for transmitting the DMX512-A lighting control protocol and Remote Device Management (RDM) protocol using the User Datagram Protocol (UDP). The sACN protocol can handle DMX communications (e.g., but not RDM).

PoE light 112 includes a light, a processor configured to control the light, and a port in electrical communication with the processor. The light can require a wattage of at least 30 watts (which can be varied for desired operation). In some embodiments, the light may require a greater minimum wattage, such as 60 watts or 90 watts.

The port of PoE light 112 is configured to receive Ethernet cable 110 that provides communication with router 108. In some embodiments, the port of PoE light 112 is a RJ45 Ethernet port, configured to receive an RJ45 cable, such as an RJ45-Cat-6 cable or any cable that is implemented according to the techniques described herein.

Figure 2:
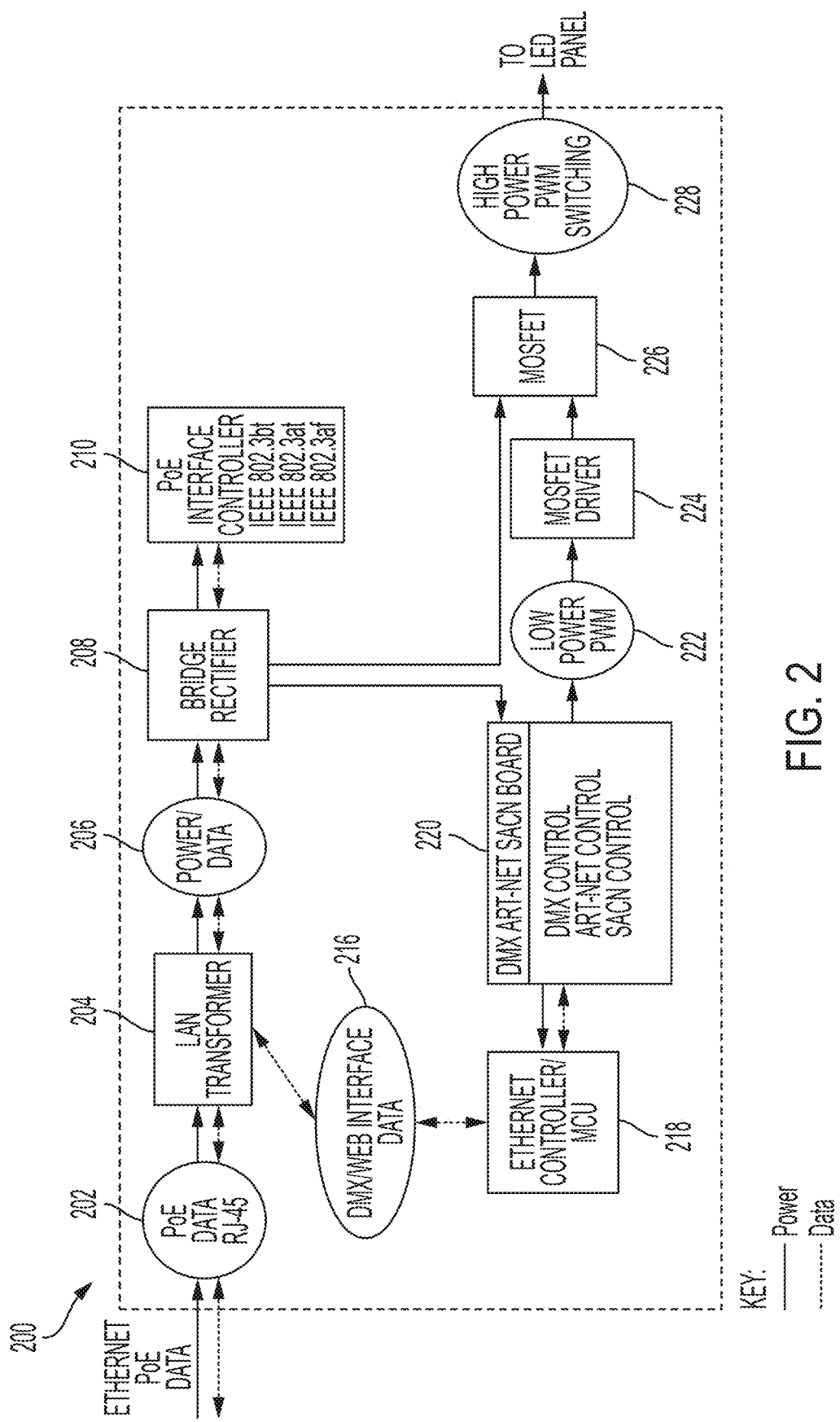
FIG. 2 is a schematic diagram showing an example implementation of a PoE light, according to some embodiments of the technology described herein.

FIG. 2 is a diagram showing an exemplary configuration of PoE light 112, according to some embodiments of the technology described herein. Specifically, FIG. 2 displays system 200 by which PoE light 112 is powered and controlled. Power and data enter system 200 via RJ-45 Ethernet port 202. The power and data then pass through Local Area Network (LAN) transformer 204. LAN transformer 204 is involved in coupling the data signals onto the cable. It helps in transferring the data signals from the circuitry within PoE light 112 to the Ethernet cable 110 and vice versa, without a direct electrical connection. This can be important for reducing interference from, or to, the signal. LAN transformer 204 also provides electrical isolation between the devices connected by the Ethernet cable 110. Thus, LAN transformer 204 can help prevent electrical surges and/or differences in ground levels from damaging the devices or affecting the data transmitted. Thus, the LAN transformer 204 splits the incoming Ethernet signal into separate paths for power and data. This feature allows the PoE light 112 to operate on a single Ethernet cable that simultaneously delivers both power and control signals, as discussed further herein.

As discussed above, in PoE systems, power is sent over Ethernet cable 110 alongside data. LAN transformer 204 works with other PoE components to separate the power from the data signals so that each can be used appropriately by system 200. The power is used to operate the PoE light 112, while the data (e.g., Art-Net, sACN, and/or other protocols for lighting control) is used to control PoE light 112. LAN transformer 204 additionally helps to filter out noise from the signals on the Ethernet cable 110. Noise can be induced from various sources, such as electrical interference from other devices, which can disrupt the data being transmitted. Thus, LAN transformer 204 aids in keeping the communication clear. Finally, by balancing the transmission lines, LAN transformer 204 helps maintain the quality of the data signals over the length of Ethernet cable 110, which can be beneficial for both the reliability and speed of data transmission. At LAN transformer 204, the data is split into two branches. For the first branch, power/data 206 includes information such as the fact that a PoE device is being used, which will instruct system 200 to respond accordingly, as well as other PoE-related data. DMX/web interface data 216 includes data related to the DMX protocol.

Power/data 206 is passed to bridge rectifier 208. Bridge rectifier 208 may supply power to PoE Interface Controller 210, a digital multiplexer (e.g., DMX Art-Net sACN Board) 220, and to the LED panel by way of a transistor (e.g., MOSFET) 226. Bridge rectifier 208 can be designed or configured to ensure that regardless of the polarity of the DC voltage received, the output will have the correct polarity required by the electronics in system 200. This can be particularly important in PoE systems, such as system 200, because the power-sending equipment and the power-receiving equipment might not always have the same wiring configuration. Thus, bridge rectifier 208 can ensure the DC power received is properly conditioned for the device's requirements, accommodating any potential reversal in the wiring configuration of the power pairs in Ethernet cable 110. In summary, bridge rectifier 208 is used to correct the polarity of the incoming DC power to ensure that PoE light 112 can always use the electricity supplied, regardless of how the power wires are configured or connected.

Power/data 206 then passes to PoE interface controller 210. PoE interface controller 210 manages the power that is sent to PoE light 112. It can be designed or configured to ensure that PoE light 112 does not, for example, draw more power than what is available and/or more than the Ethernet standard(s) allow. Additionally, in a PoE system, there is typically Power Sourcing Equipment (PSE), such as a PoE switch or injector, that provides power over the LAN. PoE interface controller 210 communicates with the PSE to negotiate the amount of power PoE light 112 needs.

When initially connected, PoE interface controller 210 helps PoE light 112 to communicate with the PSE to perform a signature detection process. This process can confirm that the connected device is PoE compatible. After detection, the PSE might perform a classification process to determine how much power the device needs. Additionally, PoE interface controller 210 provides protection against overcurrent, undercurrent, and incorrect voltage, which can occur due to wiring issues or equipment malfunctions. This helps to prevent damage to PoE light 112 and ensures safe operation.

While power/data 206 traverses the path described above, for the second branch DMX/web interface data 216 is passed to Ethernet controller/Microcontroller Unit (MCU) 218. Ethernet controller/MCU 218 controls the DMX, Art-Net, and sACN data, which are different protocols used to control stage lighting and effects. Ethernet controller/MCU 218 sends out control signals using these protocols over the Ethernet cable 110 to instruct the lights how and when to change color temperature, intensity, and/or other effects such as those mentioned above with reference to FIG. 1.

Ethernet controller/MCU 218 also handles firmware updates. Ethernet controller/MCU 218 can receive new firmware, which is the software that configures how it operates (e.g., to add features or fix bugs).

Additionally, or alternatively, Ethernet controller/MCU 218 configures network settings. For example, it can allow a user to change the IP address, which is the unique address that identifies PoE light 112 on network 106. The IP address allows, for example, the user to control PoE light 112 from a console or computer. Ethernet controller/MCU 218 also adjusts Art-Net and sACN settings, which allow a user to customize how PoE light 112 receives and responds to control signals for more advanced lighting setups.

In some embodiments, Ethernet controller/MCU 218 manages a web interface. Specifically, it can host a web interface, which is a website running in system 200 that can be accessed from a computer or mobile device on the same local network. When a user connects to the IP address of PoE light 112 with a web browser, the user communicates with Ethernet controller/MCU 218, which shows the user the interface and lets the user interact with PoE light 112 and change settings. In some embodiments, some settings (e.g., the DMX, Art-Net, and/or sACN settings) cannot be changed from the web interface. For example, DMX control settings can only be changed using dedicated Art-Net or sACN software running on a computer or mobile device connected to the same local network.

In short, Ethernet controller/MCU 218 is responsible for sending out the right signals to control the lighting, talking to the computer or console, and making sure everything is up to date and configured correctly.

Based on control signals sent out by Ethernet controller/MCU 218, DMX Art-Net sACN Board 220 creates a low power Pulse Width Modulation (PWM) signal 222. PWM can be used to control the brightness of the lights by rapidly turning them on and off at a frequency that is typically too fast for the human eye to detect. With PWM, the lights are switched on and off very quickly, in cycles. When the light is on for more of the time and off for less, it appears brighter. Conversely, when the light is on for less of the time and off for more, it appears dimmer. The apparent brightness is adjusted by changing the duty cycle of the PWM signal, which is the proportion of time the light is on versus the time it's off within one cycle. A higher duty cycle means a longer "on" time, and thus more brightness.

Advantageously, brightness need not be controlled by adjusting voltage or amperage directly. Instead, PWM can be used to regulate the dimming function. The PWM approach enables the efficient operation of the lighting system, allowing for a more refined and responsive dimming capability. This is achieved by modulating the width of the pulses in the power signal, thus controlling the amount of power that reaches the LEDs over a given period without altering the voltage or current levels.

Low power PWM signal 222 determines the speed and duration of the pulses that control how much time the power is on versus off in the duty cycle. In some examples, low power PWM signal 222 is a square wave that alternates between on and off states at a rapid pace and is received by MOSFET Driver 224. MOSFET driver 224 boosts low power PWM signal 222 so that it can effectively control the power going through MOSFET 226 (described in further detail below), thus managing the power delivered to a high-power load like an LED panel. MOSFET driver 224 is a specialized chip designed to control MOSFET 226, which is a type of transistor used for switching electronic signals. The driver chip acts as an interface between the control signal from DMX Art-Net sACN Board 220 and MOSFET 226. It ensures that MOSFET 226 operates as intended, safely and efficiently, responding accurately to the control inputs it receives.

MOSFET 226 acts as a switch that can turn on and off rapidly in response to the duty cycle of the signal received from MOSFET driver 224. A higher duty cycle means that MOSFET 226 is on more often, delivering more power to the load, and a lower duty cycle means that MOSFET 226 is on less often, delivering less power to the load.

The pathways that direct power and data from the LAN transformer 204 to different parts of the PoE light 112, including components 206, 208, 210, 220, and 226, allow the PoE light 112 to operate as discussed herein. These paths ensure that the power is routed to the illumination elements, while data is directed to the control circuits. This separation can be important for reliable operation, preventing signal interference and allowing precise control over lighting functions, such as intensity and color.

In high power applications like the one disclosed herein, MOSFET 226 is controlling a significant amount of current or operating at a high voltage sourced from the bridge rectifier 208. Therefore, MOSFET 226 is engaged in High Power PWM Switching 228 because the PWM signal is controlling a high-power load through MOSFET 226. While MOSFET 226 is responsible for switching high power in response to a PWM signal, it is not itself the source of a PWM signal.

In some embodiments, PoE light 112 may include at least a first PoE port and a second PoE port, where both ports are in electrical communication with the processor. The first port may be configured to receive a first Ethernet cable 110 and a second port may be configured to receive a second Ethernet cable 110. Each Ethernet cable 110 may provide communication with router 108. Router 108 may provide, for example, up to 30 watts of power, 50 watts of power, 60 watts of power, 90 watts of power, 125 watts of power, 150 watts of power, 165 watts of power and/or the like, to PoE light 112 through each Ethernet cable 110. For example, to provide large lights that still comply with any applicable limits (e.g., IEEE 90 W limit per Ethernet cable), embodiments can be powered by 2 PoE cables to bring essentially double power to the lights (e.g., 180 W of power, for the 90 W limit example). For example, a first Ethernet port can provide 90 W of power and data, and a second Ethernet port can provide 90 W of power (e.g., and no data).

Figure 3:
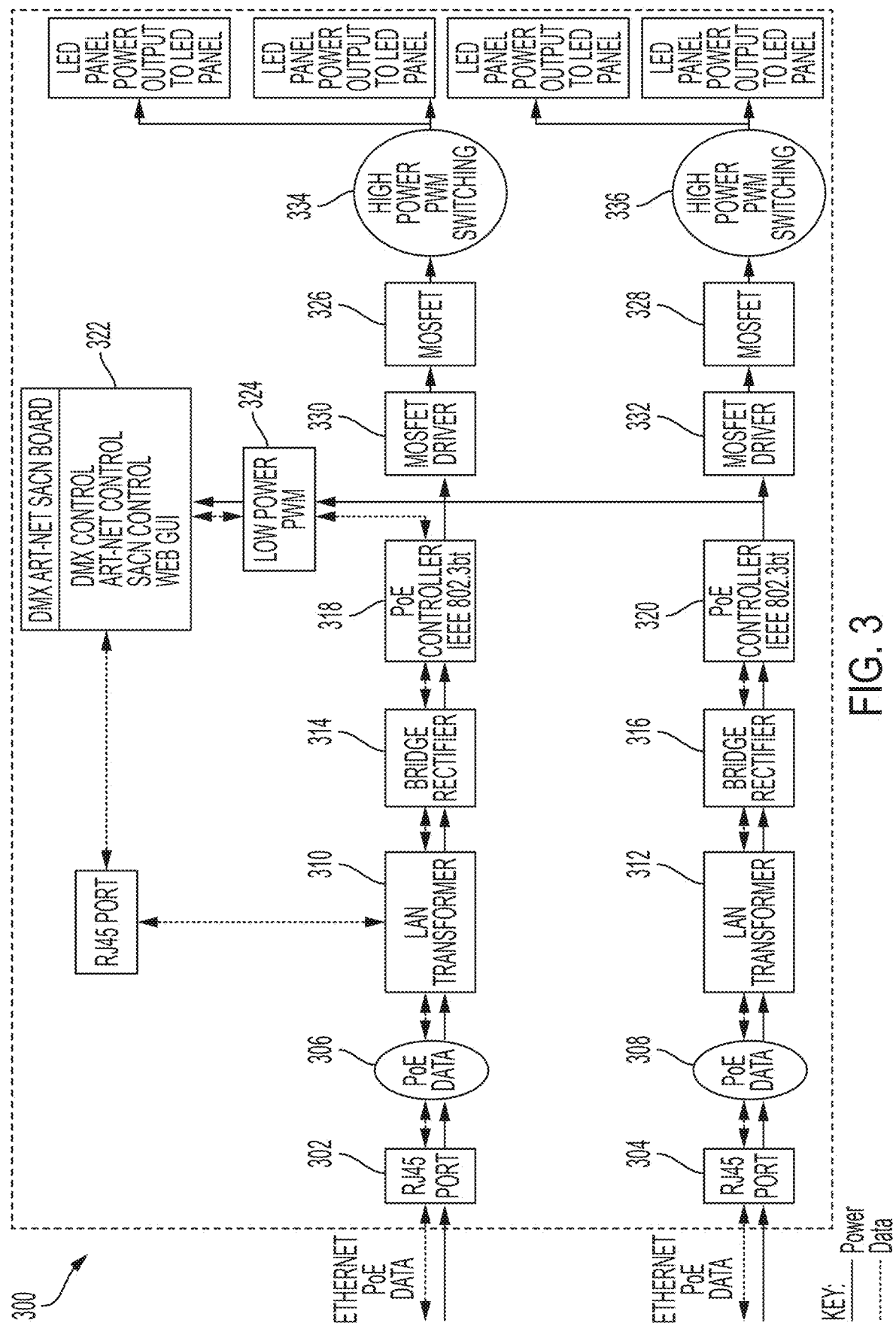
FIG. 3 is a schematic diagram showing an example implementation of a PoE light, according to some embodiments of the technology described herein.

FIG. 3 is a diagram showing an exemplary configuration of PoE light 112, according to some embodiments of the technology described herein. Specifically, FIG. 3 displays system 300 by which PoE light 112 is powered and controlled. Power and data enter system 300 via RJ-45 Ethernet port 302 and 304. By aggregating power from two Ethernet ports 302 and 304, system 300 may exceed the 90 W limitation of using an individual IEEE 802.3bt PoE cable, delivering high power and data connectivity over standard PoE infrastructures. The two RJ45 connectors 302 and 304 thus supply power to the light through dual PoE inputs. This design can enable the light to receive a higher wattage than a single PoE connection can typically deliver, making it suitable for, e.g., more power-intensive applications. The dual PoE setup can thus allow the PoE light 112 to maintain high performance without requiring additional or specialized power infrastructure. Once the dual PoE input is established, components 302, 304, 306, 308, 310, 312, 314, and 316, a discussed further herein, illustrate the pathways that manage both power and data distribution within the light. These components can ensure that the increased power from the dual PoE setup is directed to the necessary illumination components, while data commands are still efficiently routed to the control circuitry. This setup can be beneficial for supporting higher-wattage functionality while preserving reliable data handling.

The power and data 306 and 308 then pass through LAN transformers 310 and 312. LAN transformers 310 and 312 may be similar to LAN transformer 204. Power/data 306 and 308 are passed to bridge rectifiers 314 and 316. Bridge rectifiers 314 and 316 may be similar to bridge rectifier 208.

Power/data 306 and 308 then passes to PoE interface controllers 318 and 320. PoE interface controllers 318 and 320 manage the power that is sent to PoE light 112. Power/data 306 and 308 may be passed to the DMX Art-Net sACN Board 322. DMX, Art-Net, and/or sACN settings may be remotely controlled and monitored through a web-based GUI.

In some embodiments, the brightness of PoE light 112 may be controlled by adjusting the PWM duty cycle as described in reference to FIG. 2. System 300 may provide higher wattage and precise brightness control via PWM dimming by levering two RJ45 ports. DMX Art-Net sACN Board 322 may create a low power PWM signal 324. Low power PWM signal 324 may be received by MOSFET driver 330 and 332. MOSFET 326 and 328 may act as a switch that can turn on and off rapidly in response to the duty cycle of the signal received from MOSFET driver 330 and 332. MOSFET driver 330 and 332 ensures MOSFET 326 and 328 responds accurately to the control input it receives. MOSFET 326 and 328 may engage in High Power PWM Switching 334 and 336 when the PWM signal controls a high-power load through MOSFET 326 and 328. MOSFET driver 330 and 332 may manage the power delivered to PoE light 112.

Figure 4A:
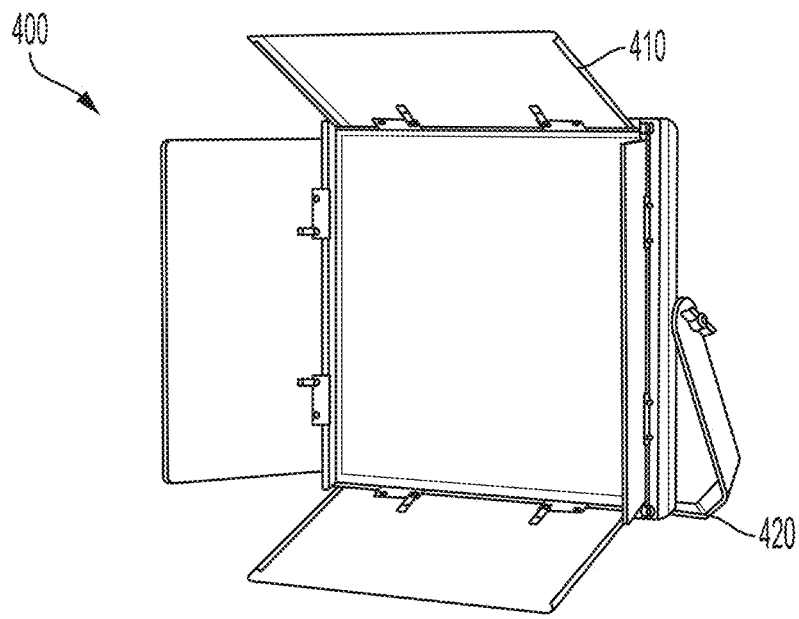
FIGS. 4A-I show different views of an example of a panel PoE light, according to some embodiments of the technology described herein.

According to some embodiments, the light can be a panel light. FIGS. 4A-I show different views of an example of a panel PoE light 400, according to some embodiments of the technology described herein. FIG. 4A shows a head-on view of the front of a panel PoE light 300. In some embodiments, PoE light 400 is made of heavy duty resin plastic and metal. In some embodiments, panel PoE light 400 is equipped with high color rendering index (CRI) light-emitting diode (LED) chips and a soft panel, which allows it to emit a wraparound light with clean and sharp shadow. In some embodiments, panel PoE light 400 may have a color temperature range of 3200K to 5600K. In some embodiments, panel PoE light 400 may have a 110-degree beam angle. As shown in FIG. 4A, panel PoE light 400 may also have built-in barn doors 410. Built-in barn doors 410 may offer integrated clips to add light modifiers. In some embodiments, panel PoE light 400 may also include a TV Monitor Panel (TVMP) mount 420. TVMP mount 420 interfaces with scissor clamps 480 (described with reference to FIG. 4B below) to allow PoE light 400 to be independently mounted from the ceiling.

Figure 4B:
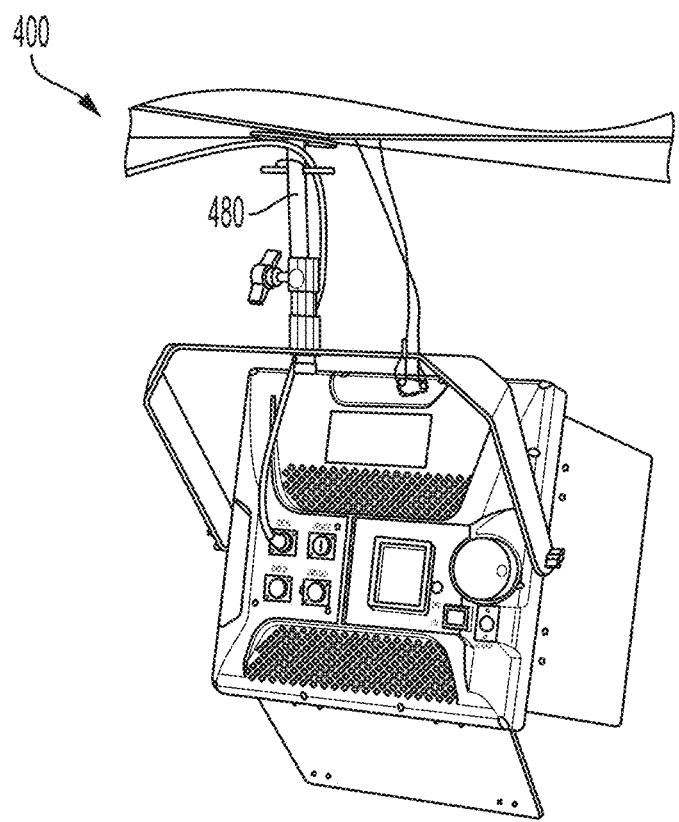

The panel PoE light may be mounted in a variety of ways. For example, FIG. 4B shows a perspective view of a panel PoE light 400, independently mounted from the ceiling. In the embodiment shown in FIG. 4B, panel PoE light 400 is mounted below a standard drop ceiling using scissor clamps 480.

Figure 4C:
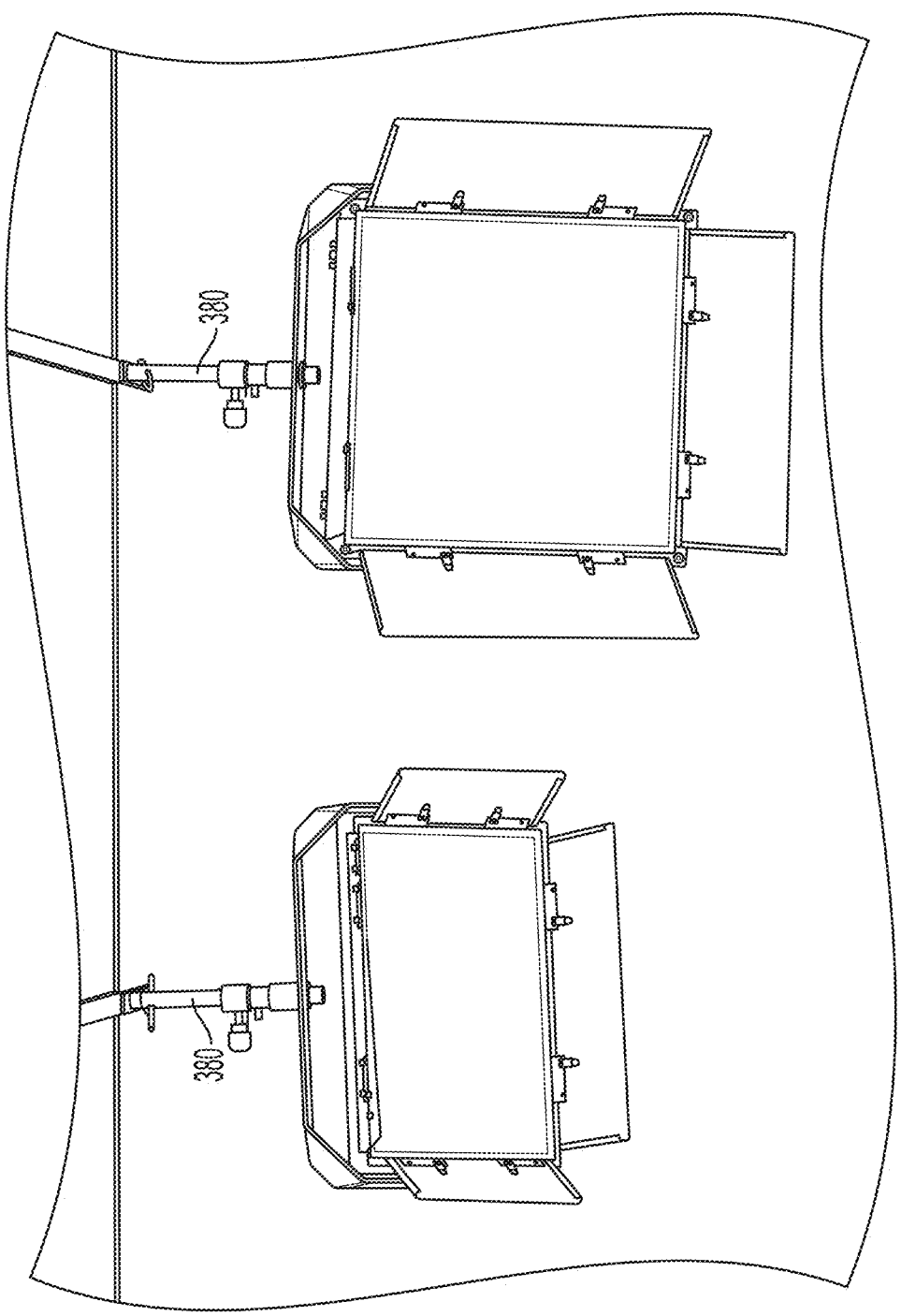

FIG. 4C shows another view of two PoE lights 400, each independently mounted below a standard drop ceiling using scissor clamps 480.

Figure 4D:
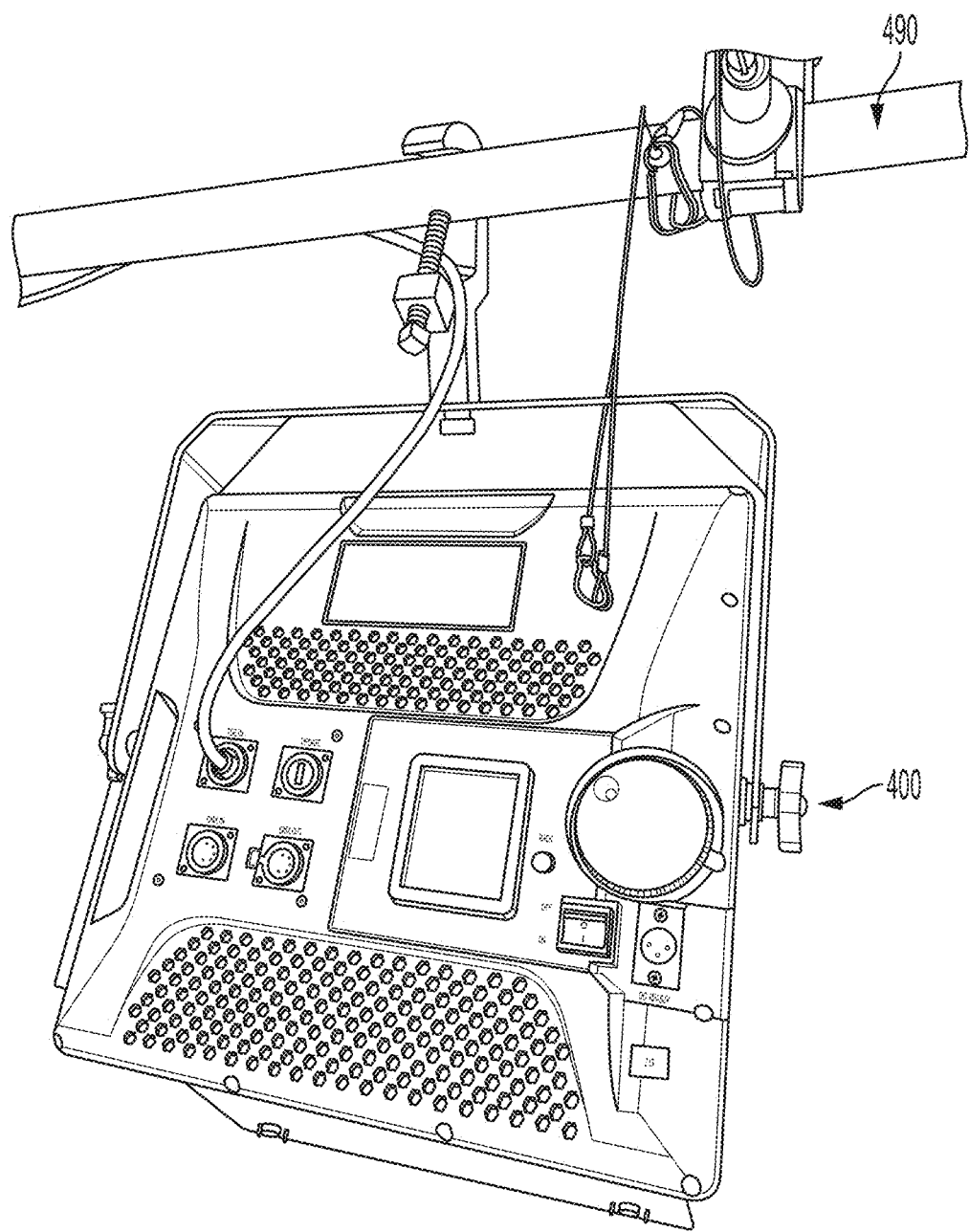

In some embodiments, the PoE light may be mounted via a grid pipe clamp. For example, FIG. 4D shows a back view of a panel PoE light 400 mounted from a grid pipe clamp 490.

In some embodiments, the PoE light may also be mounted onto a standard lighting stand.

Figure 4E:
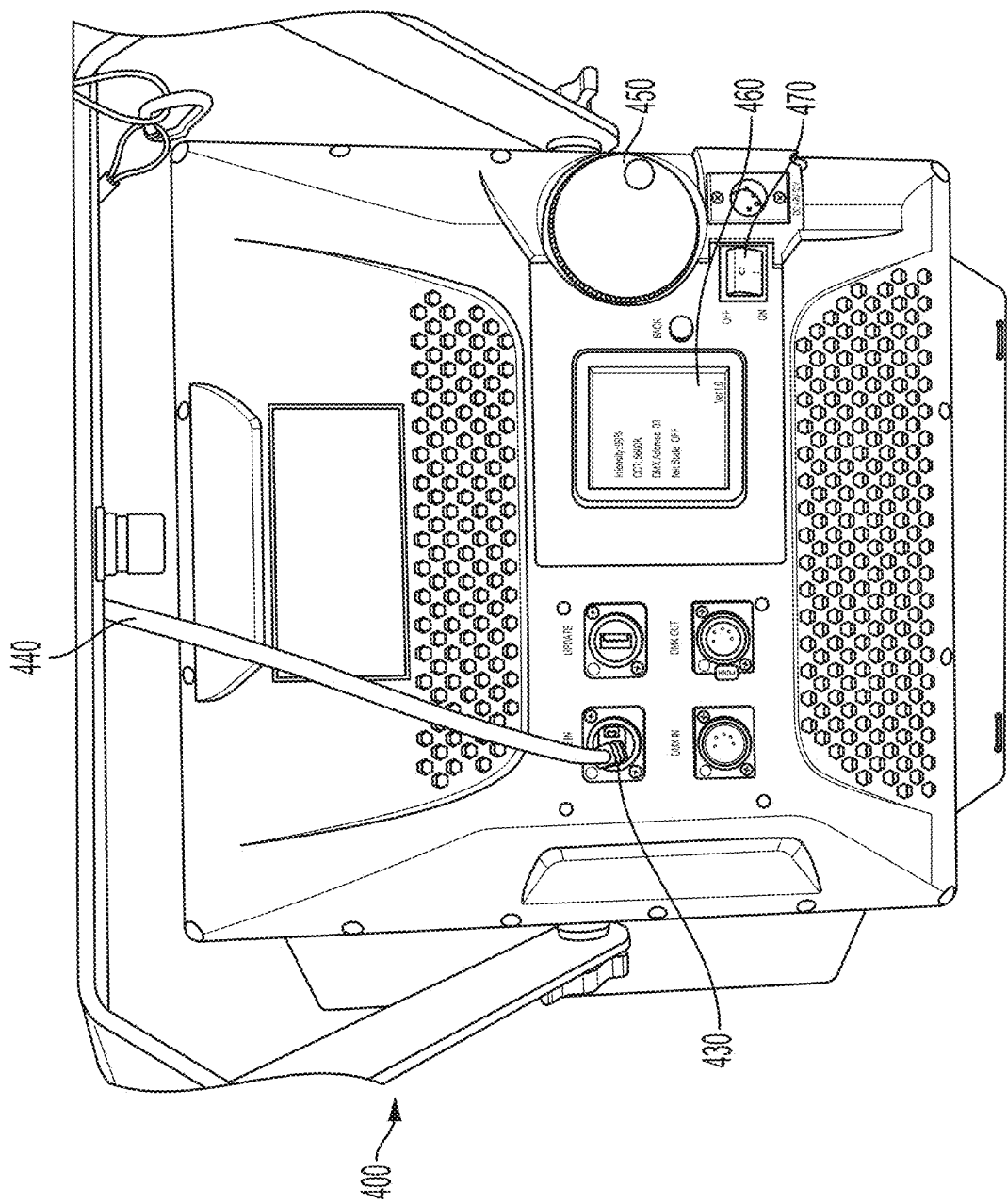

FIG. 4E shows a head-on view of the back of a panel PoE light 400. As shown in FIG. 4E, the back of panel PoE light comprises port 430, configured to receive Ethernet cable 440, which provides communications with a router. In some embodiments, the back of panel PoE light 400 comprises control knob 450, which can be used to adjust the brightness, color temperature, and DMX channels of panel PoE light 400. In some embodiments, the back of panel PoE light 400 comprises an LED readout 460. LED readout 460 may display data including the brightness, color temperature, and/or DMX channels of panel PoE light 400, making it easier for a user to adjust these features using control knob 450. In some embodiments, the back of panel PoE light 400 comprises a power switch 470 which can be toggled between an "on" position and an "off" position to turn the panel PoE light on and off.

Figure 4F:
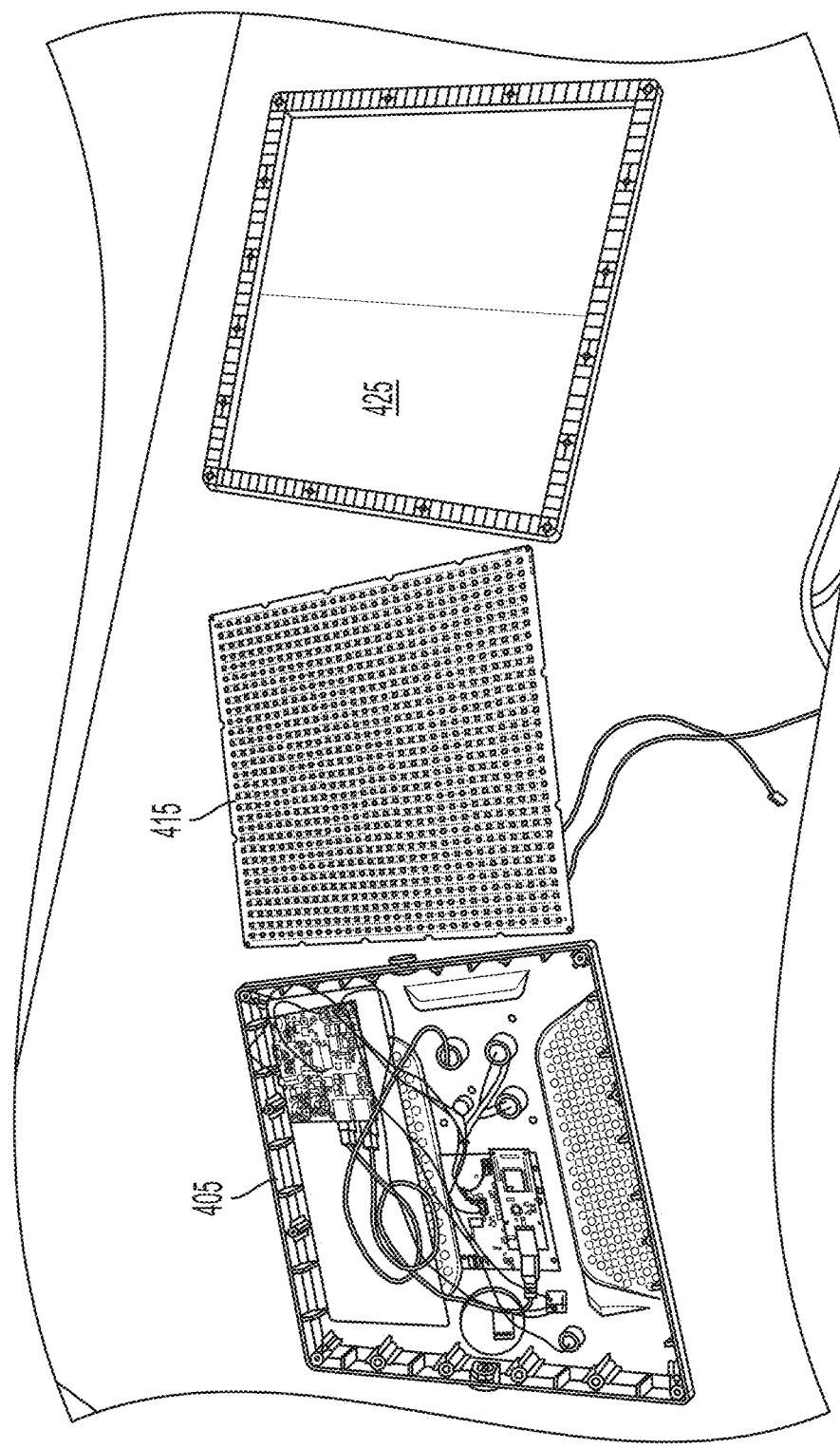
Figure 4G:
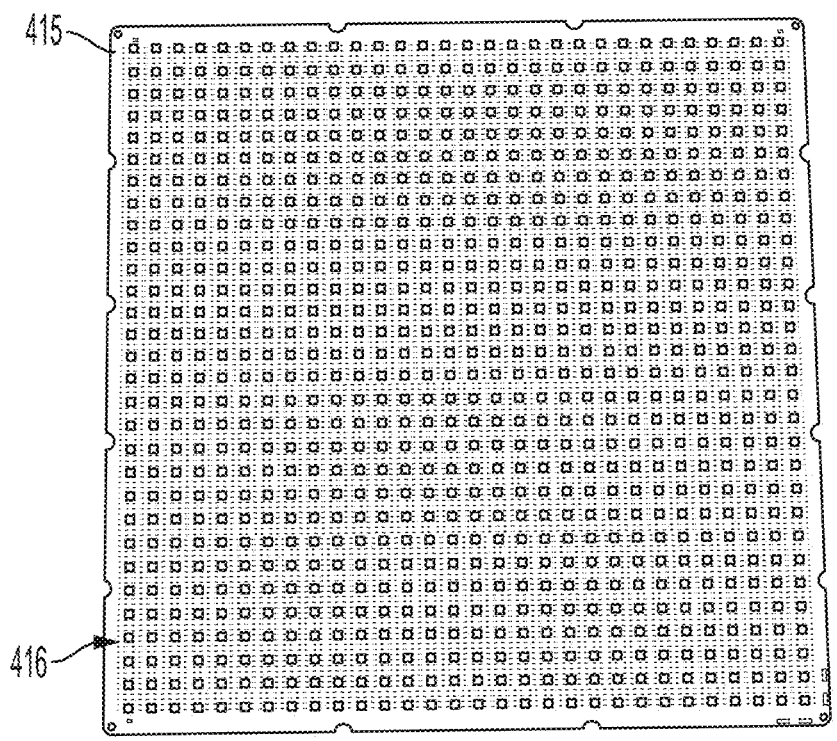
Figure 4H:
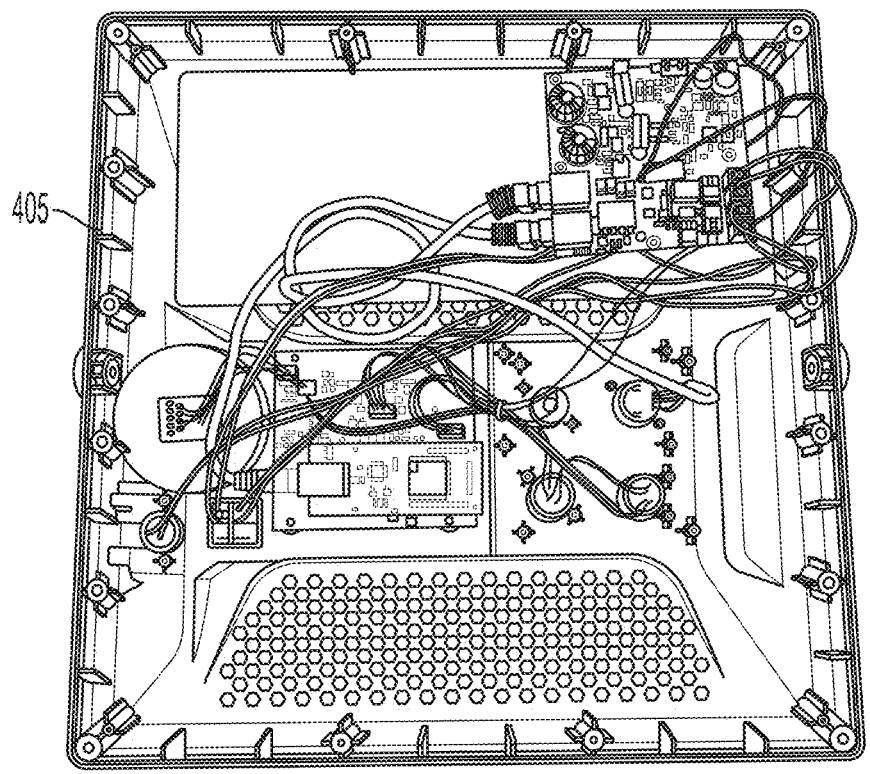
Figure 4I:
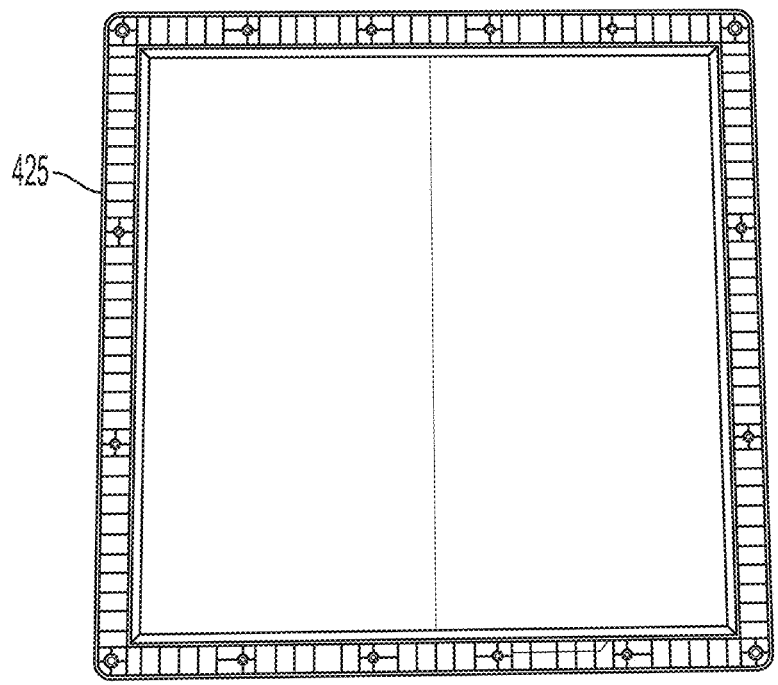

FIG. 4F shows a disassembled panel PoE light 400, according to some embodiments. In panel PoE light 400, chip on board (COB) LEDs 416 are soldered on a PCB board 415. FIG. 4G shows PCB board 415 in more detail, such that COB LEDs 416 are visible. PCB board 415 is then attached to the light enclosure 405 along with the soft panel diffuser 425 as a single unit. Light enclosure 405 and soft panel diffuser 425 are shown in more detail in FIG. 4H and FIG. 4I, respectively. The combination of COB LED lights 416 with the soft panel diffuser 425 creates a uniform edge-to-edge light source.

Figure 5A:
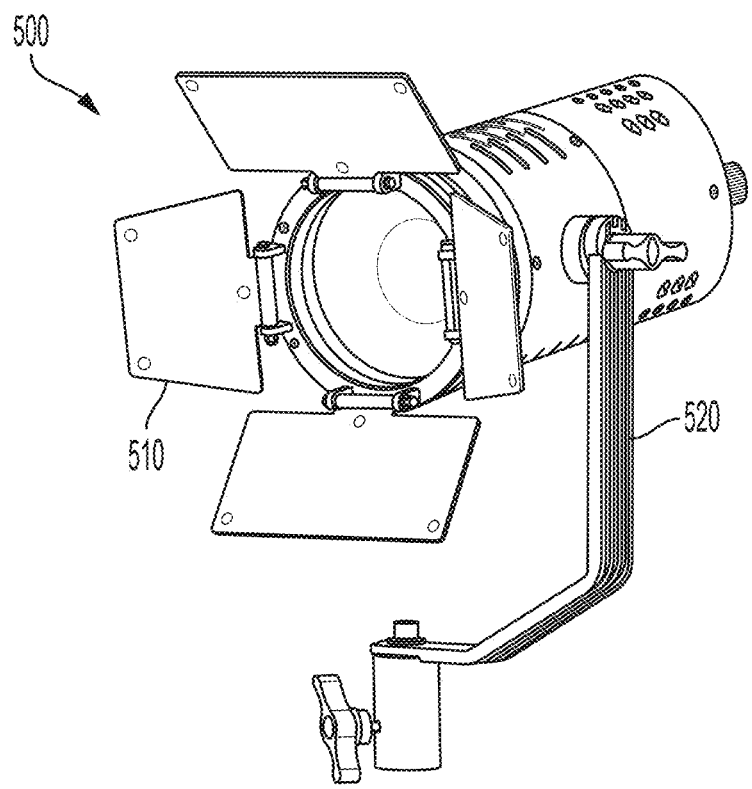
FIGS. 5A-F show different views of an example of a Fresnel PoE light, according to some embodiments of the technology described herein.

According to some embodiments, the light fixture can be a Fresnel light. Fresnel lights include Fresnel lenses that can focus and shape the light precisely to a desired beam size. FIGS. 5A-F show different views of an example of a Fresnel PoE light 500, according to some embodiments of the technology described herein. FIG. 5A shows a head-on view of the front of a Fresnel PoE light 500. As discussed above with reference to panel PoE light 400, in some embodiments, Fresnel PoE light 500 is made of heavy duty resin plastic and metal. Fresnel PoE light 500 is also equipped with high color rendering index (CRI) light-emitting diode (LED) chips and Fresnel focusing lens 515, which allows it to emit a focused light with clean and sharp shadows. In some embodiments, Fresnel PoE light 500 may have a color temperature range of 3200K to 5600K and/or may have a 110-degree beam angle. As shown in FIG. 5A, Fresnel PoE light 500 may also have built-in barn doors 510, which may offer integrated clips to add light modifiers. In some embodiments, Fresnel PoE light 500 may also include a TV Monitor Panel (TVMP) mount 520. TVMP mount 520 interfaces with scissor clamps 580 (described with reference to FIG. 5B below) to allow PoE light 500 to be independently mounted from the ceiling.

Figure 5B:
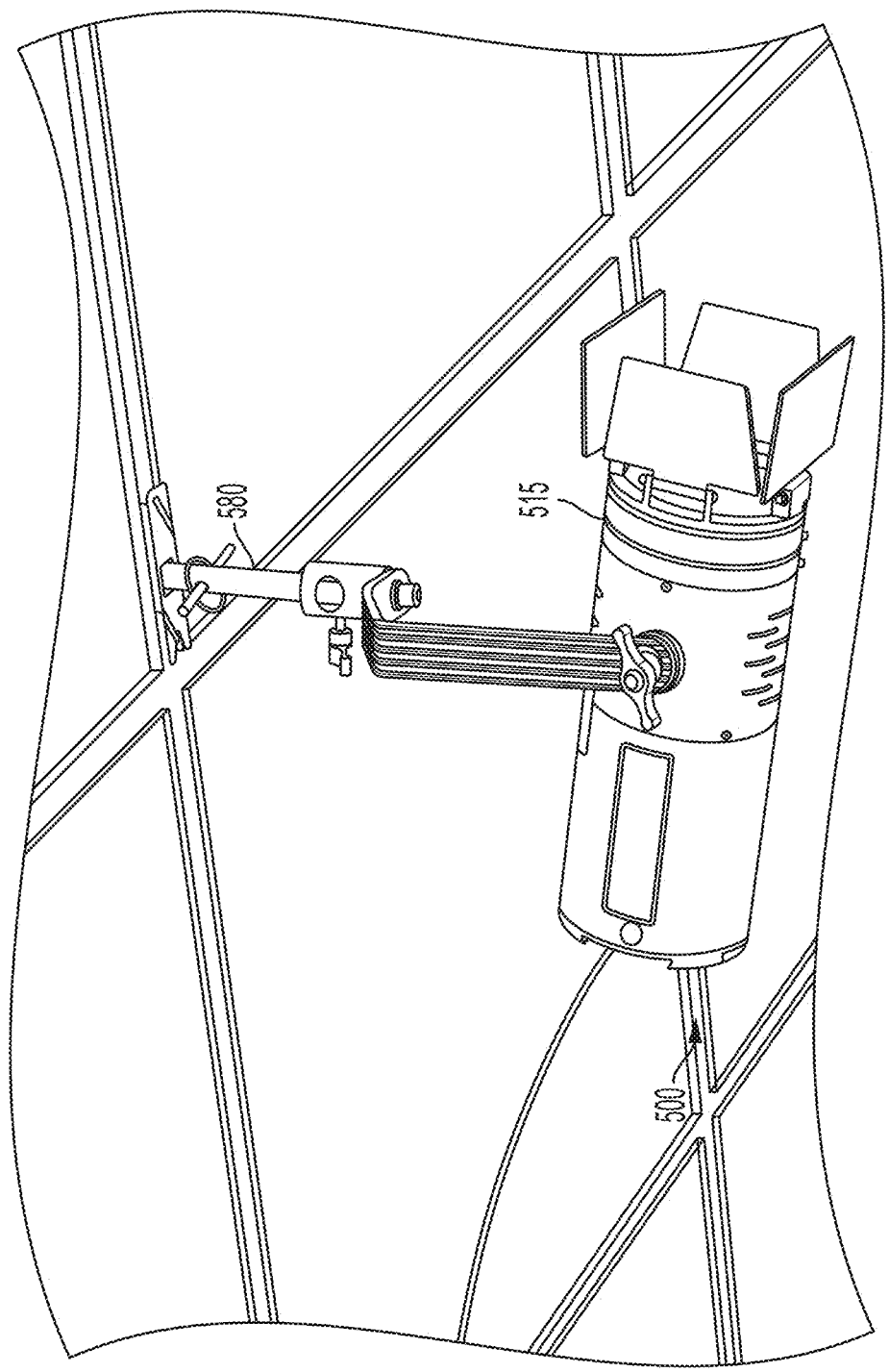

The Fresnel PoE light may also be mounted in a variety of ways. For example, FIG. 5B shows a perspective view of a Fresnel PoE light 500, independently mounted from the ceiling. In the embodiment shown in FIG. 5B, Fresnel PoE light 500 is mounted below a standard drop ceiling using scissor clamps 580.

Figure 5C:
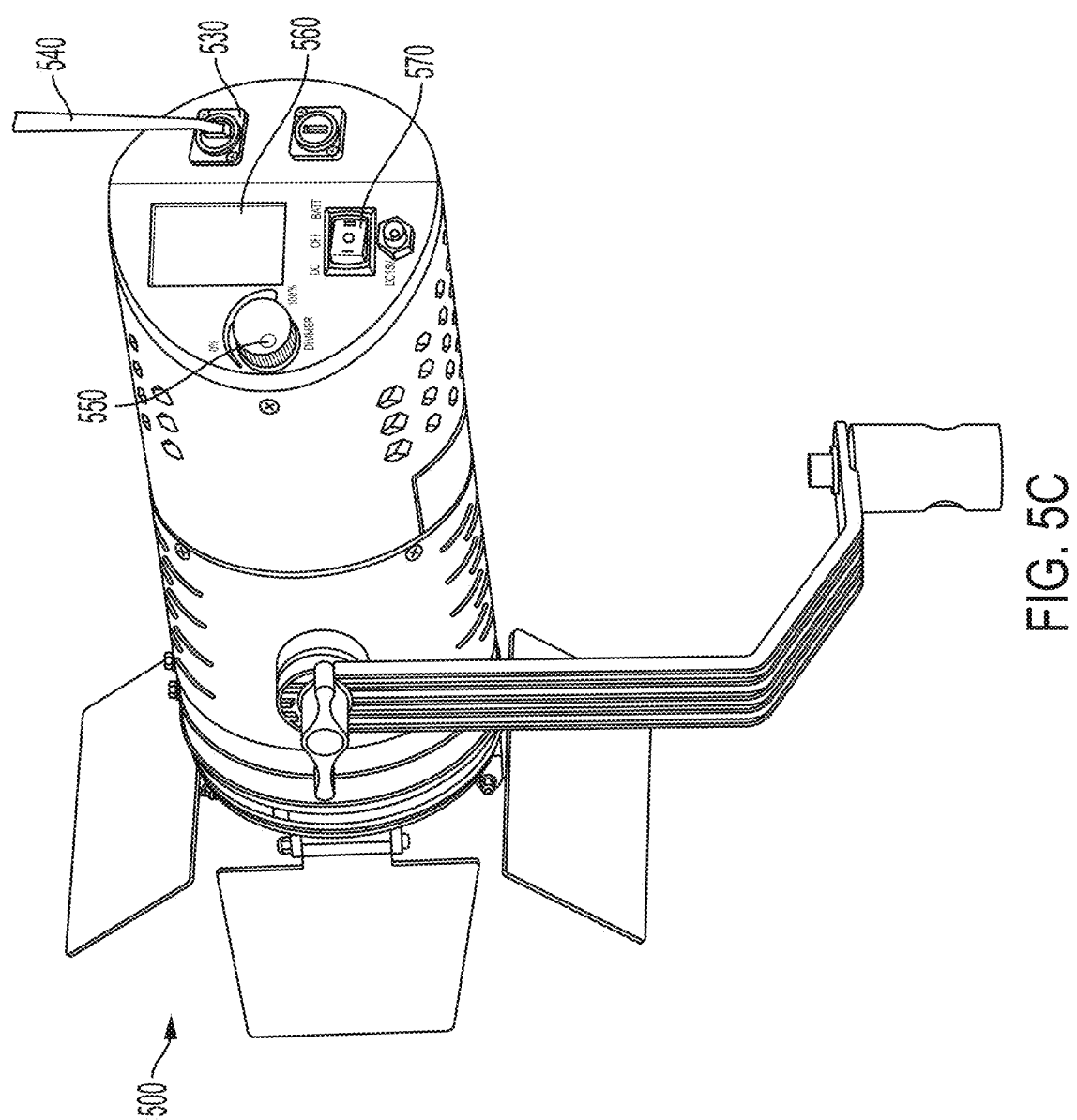

FIG. 5C shows a head-on view of the back of a Fresnel PoE light 500. As shown in FIG. 5C, the back of Fresnel PoE light comprises port 530, configured to receive Ethernet cable 540, which provides communications with a router. In some embodiments, the back of Fresnel PoE light 500 comprises control knob 550, which can be used to adjust the brightness, color temperature, and DMX channels of Fresnel PoE light 500. In some embodiments, the back of Fresnel PoE light 500 comprises an LED readout 560. LED readout 560 may display data including the brightness, color temperature, and/or DMX channels of Fresnel PoE light 500, making it easier for a user to adjust these features using control knob 550. In some embodiments, the back of Fresnel PoE light 500 comprises a power switch 570 which can be toggled between an "on" position and an "off" position to turn the Fresnel PoE light on and off.

Figure 5D:
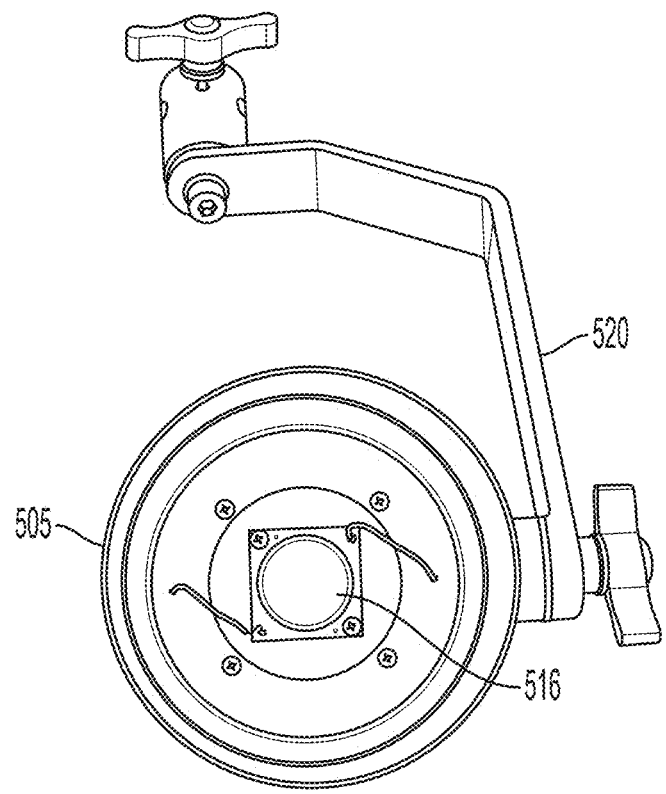
Figure 5E:
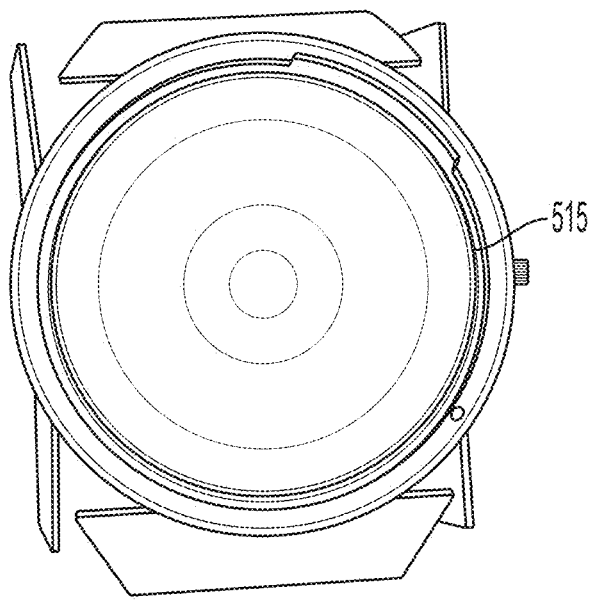
Figure 5F:
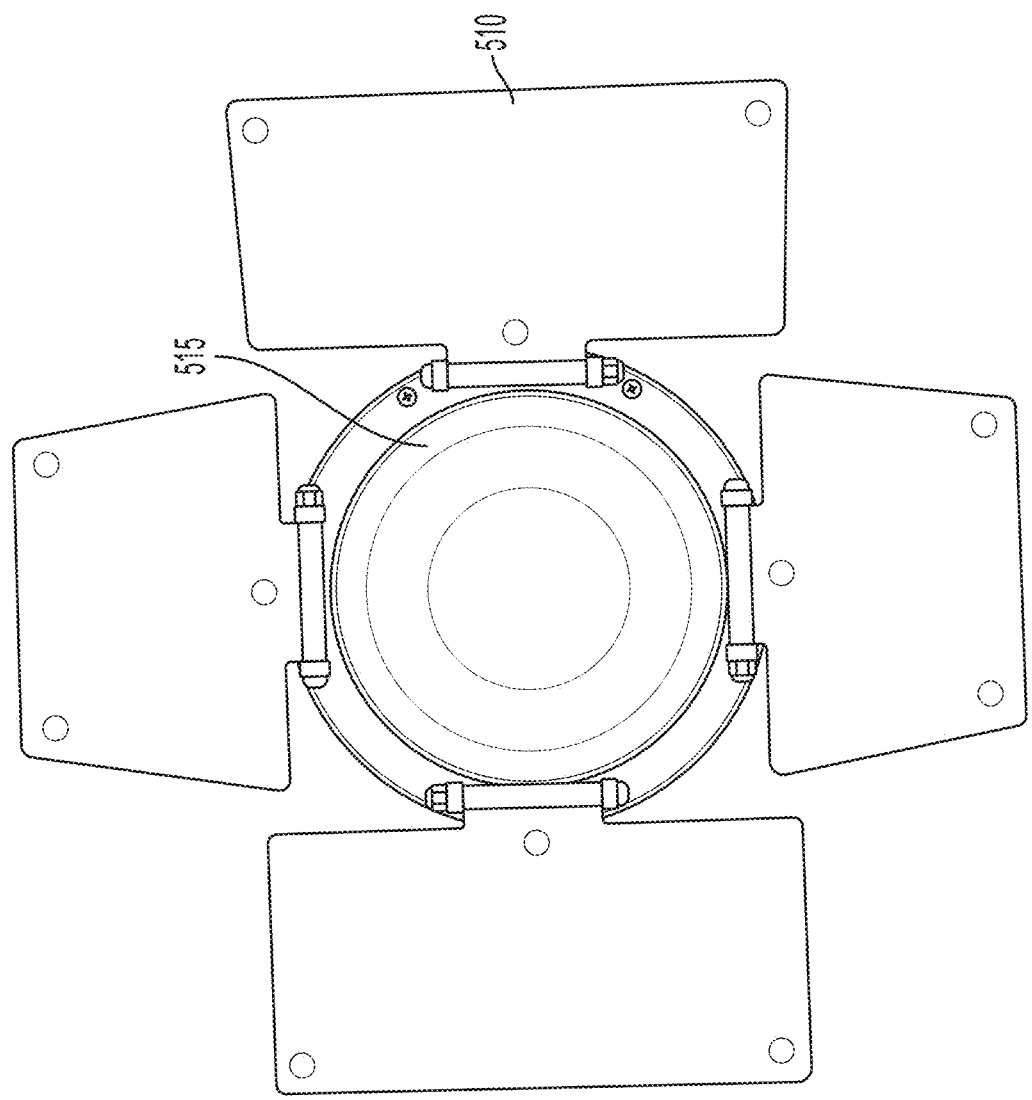

FIG. 5D shows a close up view of Fresnel enclosure 505, with TVMP mount 520 attached. Like panel PoE light 400, Fresnel PoE light 500 includes COB LEDs 516 that are soldered on a PCB board and attached to Fresnel enclosure 505. FIG. 5E shows a close-up view of Fresnel lens 515. FIG. 5F shows a close-up view of Fresnel lens 515, with built-in barn doors 510 attached.

Figure 6:
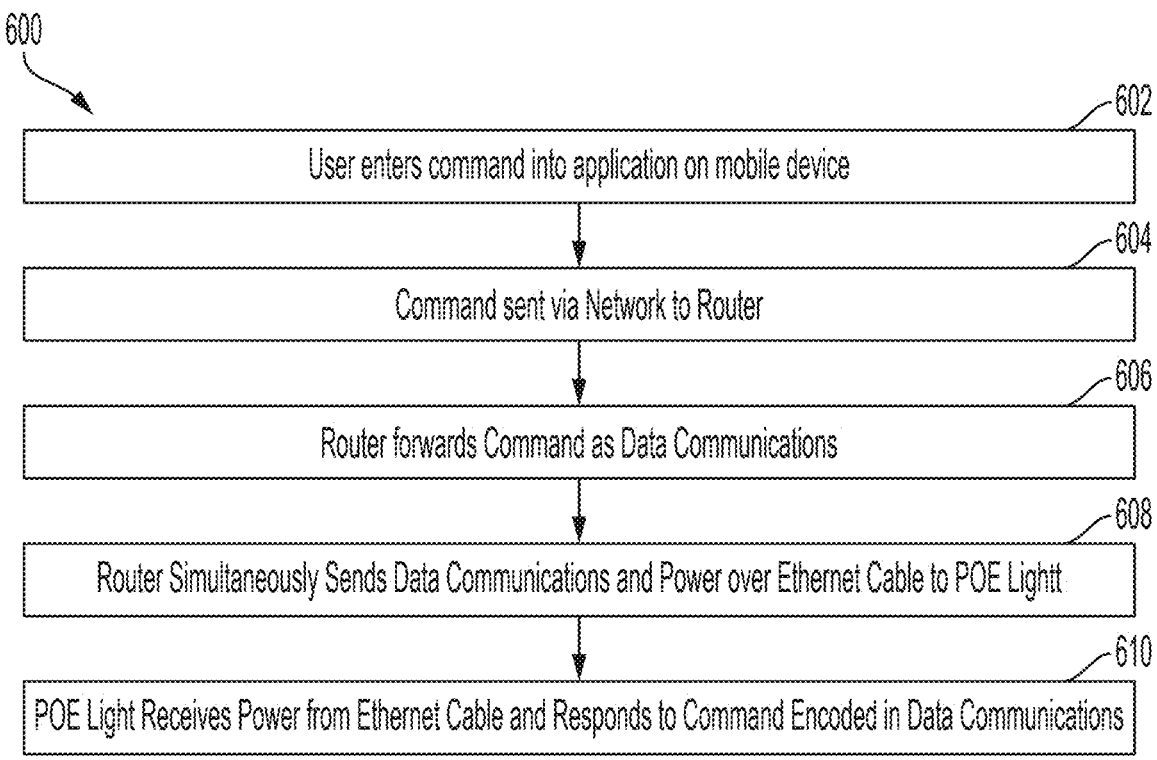
FIG. 6 is a flow chart of an exemplary computerized method for a user to control a PoE light, according to some embodiments of the technology described herein.

FIG. 6 shows a process 600 by which a user may control a PoE light remotely via a mobile device, such as in the system illustrated in FIG. 1. In first step 602 of process 600, the user enters a command into an application running on the mobile device. The command may be, for example, to control the intensity of the PoE light, the color temperature of PoE light, light channels such as RGB channels and/or RGBWA channels of the PoE light, the toggling of certain effects on PoE light (e.g., flashing, a party effect, a candle effect, etc.). The mobile device may be connected remotely to the PoE light. The application may be an application designed for controlling the PoE light, which the user has installed on the mobile device. In the next step 604 of process 600, the command entered by the user is sent to a router and/or other network equipment via a network. In the next step 606 of process 600, the router forwards the command as data communications, suitable for controlling a PoE light. In the next step 608 of process 600, the router sends these data communications, as well as power for the PoE light, over at least one Ethernet cable to the PoE light. Finally, in the last step 610 of process 600, the PoE light receives both the power and data communications from the router via a port of the PoE light, which is in electrical communication with a processor of the PoE light. The processor may then process the data communications received, enabling the PoE light to respond to the command from the user that is encoded in the data communications. For example, the PoE light can process the power and data as discussed in conjunction with FIG. 2.

For example, the user may enter a command into the application the mobile device to adjust the intensity of the PoE light to 50% (e.g., using DMX512, ArtNet or sACN). In DMX512, the command may be translated into a DMX channel signal with a value that represents an intensity of 50%. The DMX channel signal carrying the intensity information may be sent to the router. The router may forward the intensity information as the DMX channel signal to the PoE light over at least one Ethernet cable. The PoE light may receive and decode the DMX channel signal. The PoE light may interpret the intensity information and adjust the intensity output according to the command. As another example, for color temperature, DMX512 can encode a specific channel value, which the light can interpret as a command to adjust to set the temperature.

Figure 7:
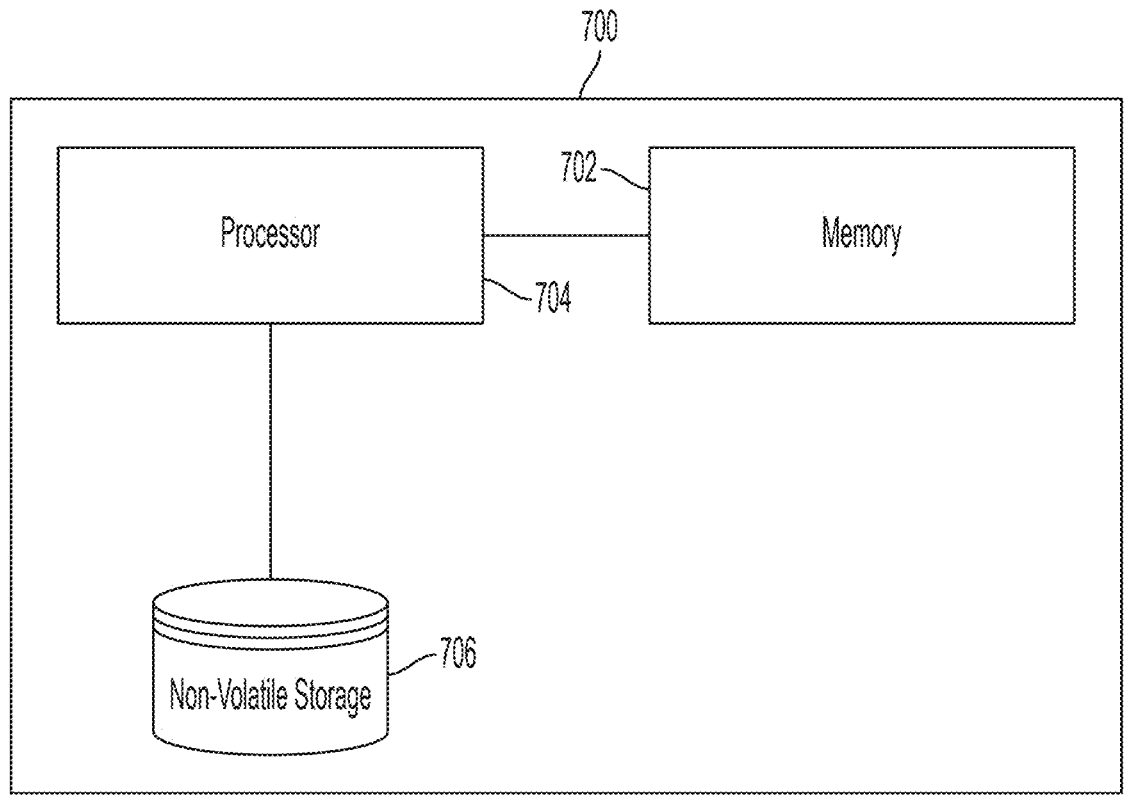
FIG. 7 is a block diagram of an illustrative computing system that may be used in implementing some embodiments of the technology described herein.

An illustrative implementation of a computer system 700 that may be used in connection with any of the embodiments of the disclosure provided herein is shown in FIG. 7. The computer system 700 may include one or more processors 704, memory 702, and one or more non-volatile storage media 706. The processor(s) 704 may control writing data to and reading data from the memory 702 and the non-volatile storage device 706 in any suitable manner, as the aspects of the technology described herein are not limited in this respect. To perform any of the functionality described herein, the processor(s) 704 may execute one or more processor-executable instructions stored in one or more non-transitory computer-readable storage media (e.g., the memory 702), which may serve as non-transitory computer-readable storage media storing processor-executable instructions for execution by the processor(s) 704.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the description provided herein be regarded as including such equivalent constructions insofar as they do not depart from the spirit and scope of the disclosed subject matter.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A power over Ethernet (POE) light for media applications, comprising:
    a portable housing comprising:
        a mount comprising an interface for receiving a mounting component to mount the PoE light; and
        a light requiring a wattage of at least 30 watts for proper operation;
    a port is configured to receive an Ethernet cable that provides communication with a network controller device, the network controller device providing over the Ethernet cable both:
        power for the PoE light to operate at the wattage; and
        data communications for the PoE light; and
    a control system disposed within the portable housing, the control system comprising:
        a transformer directly coupled to the port and configured to separate the power and the data communications;
        a processor directly coupled to the transformer and configured to receive the data communications therefrom;
        a control board directly coupled to the processor and configured to control brightness of the light via a pulse width modulation signal based on the data communications;
        a MOSFET driver directly coupled to the control board and configured to receive the pulse width modulation signal;
        a bridge rectifier directly coupled to the transformer and configured to receive power therefrom; and
        a MOSFET directly coupled to the bridge rectifier and the MOSFET driver;
    wherein:
        the transformer provides power to the bridge rectifier, the bridge rectifier provides power to the control board and the MOSFET, and the control board provides power to the processor.

2. The PoE light of claim 1, wherein the wattage is 60 W.

3. The PoE light of claim 2, wherein the port is a single port.

4. The PoE light of claim 1, wherein the wattage is 90 W.

5. The PoE light of claim 4, wherein the port is a single port.

6. The PoE light of claim 1, wherein the wattage is 125 W, 150 W and/or 165 W.

7. The PoE light of claim 1, wherein the bridge rectifier is configured to transmit power and/or data to a PoE light interface controller.

8. The PoE light of claim 1, wherein the port is an RJ45 Ethernet port.

9. The PoE light of claim 1, further comprising a second port is configured to receive a second Ethernet cable that provides communication with the network controller device.

10. The PoE light of claim 9, wherein the second port is a second RJ45 Ethernet port.

11. The PoE light of claim 9, wherein:
    the control system further comprises:
        a second MOSFET driver directly coupled to the control board and configured to receive the pulse width modulation signal; and
        a second MOSFET directly coupled to the second MOSFET driver.

12. The PoE light of claim 1, wherein the light is a Fresnel light.

13. The PoE light of claim 1, wherein the light is a panel light.

14. The PoE light of claim 1, wherein the light is an ellipsoidal reflector spotlight, a par can light, or a motorized moving light.

15. The PoE light of claim 1, wherein the light is independently mountable.

16. The PoE light of claim 1, wherein the network controller device is a hub, a router, a switch, and/or a POE injector.

17. The PoE light of claim 1, wherein the network controller device is configured to communicate with a plurality of PoE lights via associated Ethernet cables for each of the plurality of PoE lights.

18. The PoE light of claim 1, wherein the processor can transmit and receive data according to a protocol, wherein the protocol is a DMX protocol, and wherein the DMX protocol is ArtNet or sACN.

19. A method of operating a power over Ethernet (POE) light for media applications, the method comprising:
    providing power to the PoE light, wherein the PoE light comprises:
        a portable housing comprising:
            a mount comprising an interface for receiving a mounting component to mount the PoE light; and
            a light requiring a wattage of at least 30 watts for proper operation; and
        a port is configured to receive an Ethernet cable that provides communication with a network controller device, the network controller device providing both:
            power for the PoE light to operate at the wattage; and
            data communications for the PoE light; and
    operating a control system, the control system disposed within the portable housing and comprising:
        a transformer directly coupled to the port and configured to separate the power and the data communications;
        a processor directly coupled to the transformer and configured to receive the data communications therefrom;

a control board directly coupled to the processor and configured to control brightness of the light via a pulse width modulation signal based on the data communications;

a MOSFET driver directly coupled to the control board and configured to receive the pulse width modulation signal;

a bridge rectifier directly coupled to the transformer and configured to receive power therefrom; and a MOSFET directly coupled to the bridge rectifier and the MOSFET driver;

wherein:

the transformer provides power to the bridge rectifier, the bridge rectifier provides power to the control board and the MOSFET, and the control board provides power to the processor.

20. A power over Ethernet (POE) light for media applications, comprising:

a portable housing comprising:

a mount comprising an interface for receiving a mounting component to mount the PoE light;

a light;

a first port configured to receive a first Ethernet cable that provides communication with a network controller device over a network; and a wherein the second port configured to receive a second Ethernet cable that provides communication with the network controller device over the network; and wherein the network controller device provides:

power of at least 30 watts to the first Ethernet cable, wherein the first Ethernet cable is in electrical communication with the processor;

power of at least 30 watts to the second Ethernet cable, wherein the second Ethernet cable is in electrical communication with the processor; and data communications for the light; and a control system disposed within the portable housing, the control system comprising:

a transformer directly coupled to the first port and configured to separate the power and the data communications;

a processor directly coupled to the transformer and configured to receive the data communications therefrom;

a control board directly coupled to the processor and configured to control brightness of the light via a pulse width modulation signal based on the data communications;

a MOSFET driver directly coupled to in electrical communication with the control board and configured to receive the pulse width modulation signal;

a bridge rectifier directly coupled to the transformer and configured to receive power therefrom; and a MOSFET directly coupled to the bridge rectifier and the MOSFET driver;

wherein:

the transformer provides power to the bridge rectifier, the bridge rectifier provides power to the control board and the MOSFET, and the control board provides power to the processor.

* * * * *